US008825688B2

(12) United States Patent
Bringer et al.

(10) Patent No.: US 8,825,688 B2
(45) Date of Patent: Sep. 2, 2014

(54) METHOD FOR SEARCHING FOR AN ENTITY USING A VERIFIER DEVICE, AND RELATED DEVICES

(75) Inventors: Julien Bringer, Paris (FR); Herve Chabanne, Paris (FR)

(73) Assignee: Morpho, Paris (FR)

( * ) Notice: Subject to any disclaimer, the term of this patent is extended or adjusted under 35 U.S.C. 154(b) by 0 days.

(21) Appl. No.: 13/387,537

(22) PCT Filed: Jul. 28, 2010

(86) PCT No.: PCT/FR2010/051594
§ 371 (c)(1),
(2), (4) Date: Jan. 27, 2012

(87) PCT Pub. No.: WO2011/015768
PCT Pub. Date: Feb. 10, 2011

(65) Prior Publication Data
US 2012/0131051 A1    May 24, 2012

(30) Foreign Application Priority Data
Aug. 7, 2009 (FR) ..................... 09 55564

(51) Int. Cl.
*G06F 17/30* (2006.01)
*H04L 9/32* (2006.01)
*H04L 9/30* (2006.01)

(52) U.S. Cl.
CPC ........... *H04L 9/304* (2013.01); *H04L 2209/805* (2013.01)
USPC ........................................ 707/758; 713/168

(58) Field of Classification Search
USPC ..................................................... 707/758
See application file for complete search history.

(56) References Cited

U.S. PATENT DOCUMENTS

2006/0180647 A1* 8/2006 Hansen ................. 235/375

FOREIGN PATENT DOCUMENTS

WO    WO-2006075150 A1    7/2006
WO    WO-2007122425 A1    11/2007

OTHER PUBLICATIONS

Juels et al., The Blocker Tag—Selective Blocking of RFID Tags for Consumer Privacy, 2003.*
Vaudenay, On Privacy Models for RFID, Proceedings ASIACRYPT 2007.*
Weis et al., Security and Privacy Aspects of Low-Cost Radio Frequency Identification Systems, 2003.*

(Continued)

*Primary Examiner* — William Spieler
(74) *Attorney, Agent, or Firm* — Gardere Wynne Sewell LLP; Andre M. Szuwalski

(57) ABSTRACT

In a method for searching for an entity belonging to a set of entities, a verifier device and the entities are arranged so as to exchange information via at least one communication channel. Each entity has a first respective identifier from which a plurality of representatives can be obtained. According to the method, a first identification word ($m_i$; $p(X_i)$), which is related to an entity for which a search is carried out, is obtained in the verifier device. The first identification word is formed by applying a first encoding function to the first identifier of the entity for which the search is being carried out so as to depend on a sub-portion of the plurality of representatives that can be obtained from said first identifier. The sub-portion is predetermined by at least one variable parameter. The first identification word, obtained on the communication channel, is transmitted from the verifier device.

19 Claims, 2 Drawing Sheets

(56) References Cited

OTHER PUBLICATIONS

Ahlswede et al: "Identification via Channels," IEEE Transactions on Information Theory, IEEE, US, vol. 198901, Jan. 1, 1989, pp. 15-29.

Ahlswede: "General Theory of Information Transfer: Updated*," Discrete Applied Mathematics, Elsevier Science, Amsterdam, NL, vol. 156, No. 9, May 1, 2008, pp. 1348-1388.

Jiang, et al: "User Identification for Convolutionally/Turbo-Coded Systems and Its Applications," IEEE Transactions on Communications, IEEE Service Center, vol. 51, No. 11, Nov. 1, 2003, pp. 1796-1808.

Moulin, et al: "A Framework for the Design of Good Watermark Identification Codes," University of Illinois (10 pages)—published Feb. 17, 2006 in SPIE.

Oohama: "Converse Coding Theorem for the Identification via Multiple Access Channels," Information Theory Workshop, 2002, Proceedings of the 2002 IEEE Oct. 20-25, 2002, Oct. 20, 2002, pp. 155-158.

Steinberg, et al: "Identification in the Presence of Side Information with Application to Watermarking," IEEE Transactions on Information Theory, vol. 47, No. 4, May 1, 2001, pp. 1410-1422.

Uyematsu, et al: "A Simple Construction of Codes for Identification via Channels Under Average Error Criterion," IEICE Transactions on Fundamentals of Electronics, Communications and Computer Sciences, Engineering Sciences Society, Tokyo, JP, vol. E79-A, No. 9, Sep. 1, 1996, pp. 1440-1443.

\* cited by examiner

METHOD FOR SEARCHING FOR AN ENTITY USING A VERIFIER DEVICE, AND RELATED DEVICES

PRIORITY CLAIM

This application is a 371 filing from PCT/FR2010/051594 filed Jul. 28, 2010, which claims the benefit of French Application for Patent No. 09 55564 filed Aug. 7, 2009, the disclosures of which are hereby incorporated by reference.

TECHNICAL FIELD

The present invention relates to searching for an entity belonging to a set of entities.

BACKGROUND

By entity is meant any hardware and/or software element, optionally associated with a device, a system or an individual. By way of non-limitative examples, there may be mentioned a wireless identification tag, such as an RFID (Radio Frequency IDentification) label, an access badge, a chip card, a mobile phone, a computer connected to a network, or other.

In order to search for an entity, it is known to use a verifier device. The latter can also take various forms depending on the type of entities for which it is intended to search. It can for example be a wireless identification reader, such as an RFID reader, a sensor, a server, or other.

The verifier device and the entities communicate with each other via at least one communication channel provided for this purpose, which can be wired or wireless as required.

According to a first known method, the search for an entity belonging to a set of entities using a verifier device is carried out by transmitting, from each entity, over the communication channel, a respective identifier, and by analyzing, in the verifier device, the received identifiers, in order to come to a conclusion as to the presence or absence of the entity being searched for.

According to a second known method, the search is carried out by transmitting, from the verifier device, the identifier of the entity being searched for via the communication channel, then, if necessary, by receiving, over the communication channel, a response from the entity that has recognized its identifier in this transmission.

This second method is more economical than the first because it makes it possible to limit the number of messages exchanged over the communication channel and the processing required for the verifier device to find the entity being searched for.

However, this second method is not without problems.

In particular, it does not protect the identity of the entities. This can be particularly problematic when the entities relate to individuals, as respect for the private life of the latter is then not ensured. This is also problematic in the case of entities relating to hardware that has a market and/or financial value, where it is desirable to prevent traceability by third parties.

An attacker listening on the communication channel can intercept the identifier transmitted by the verifier device and discover, by detecting the sent response, to what entity this identifier belongs.

SUMMARY

A purpose of the present invention is to allow a search for an entity while improving the protection of its identity.

The invention thus proposes a method for searching for an entity belonging to a set of entities using a verifier device, the verifier device and the entities of said set of entities being arranged so as to exchange items of information via at least one communication channel, each entity of said set of entities having a first respective identifier, from which a plurality of representatives can be obtained. This method comprises the following steps:

obtaining, in the verifier device, a first identification word, related to an entity for which a search is carried out, the first identification word being formed by applying a first encoding function to the first identifier of the entity for which the search is being carried out, so as to depend on a sub-portion of the plurality of representatives that can be obtained from said first identifier, said sub-portion being determined by at least one variable parameter; and transmitting, from the verifier device, the first identification word, obtained over the communication channel.

The use of an encoding function capable of generating a first identification word depending on only one portion of the representatives makes it possible to considerably improve the protection of the identity of the entities compared with the prior art mentioned in the introduction.

According to advantageous embodiments which can be combined in all envisageable ways: the method also comprises the following steps, carried out by each entity of said set of entities listening on the communication channel:

receiving an identification word corresponding to the first identification word transmitted over the communication channel; and applying a first identification function associated with the first encoding function to the received identification word and to an item of information known by said entity from among the first identifier of said entity and at least one representative of the plurality of representatives that can be obtained from said first identifier, so as to verify whether said entity corresponds to the entity being searched for; and/or an indication of the value of the variable parameter used to form the first identification word obtained is transmitted from the verifier device over the communication channel, and, for each entity of said set of entities listening on the communication channel, said application of the first identification function takes into account the indication of the value of the variable parameter received; and/or when the result of said application of the first identification function reveals that said entity corresponds to the entity being searched for, said entity sends a response to the verifier device via the communication channel; and/or said entity has a second identifier, from which a plurality of representatives can be obtained, a second identification word is obtained in said entity by applying a second encoding function to an item of information known by said entity from among the second identifier of said entity and at least one representative of the plurality of representatives that can be obtained from said second identifier so as to depend on a sub-portion of the plurality of representatives that can be obtained from said second identifier, said sub-portion being determined by at least one variable parameter, the response sent by said entity to the verifier device via the communication channel includes the second identification word; and/or an identification word corresponding to the second identification word included in said response is received in the verifier device, the verifier device applies a second identification function associated with the second encoding function to the identification word received in the verifier device and to an item of information known by the verifier device from among the second identifier of said entity and at least one representative from the plurality of representatives that can be obtained from said second identifier, so as to bring about a further verification of a correspondence between said entity and the entity being searched for; and/or the first encoding function is arranged such that, when it is applied to the first identifier of the entity being searched for, said variable parameter selects at least one representative from the plurality of representatives that can be obtained from said first identifier, said application of the first identification function comprises a comparison between said representative selected by said variable parameter and at least one representative from the plurality of representatives that can be obtained from the first identifier of said entity; and/or the value of the variable parameter used to form the first identification word obtained is chosen at random or almost at random; and/or the first identification word obtained is transmitted over the communication channel from the verifier device in an encoded way using an error-correcting code; and/or the communication channel is a wireless channel, such as a radio channel, and the verifier device comprises a wireless identification reader and at least some of the entities from the set of entities comprise wireless identification tags; and/or the ability to obtain the plurality of representatives that can be obtained from an identifier is only given to the entity from said set of entities having said identifier and to the verifier device; and/or the first encoding function is arranged such that a single first identification word may be the result of applying the first encoding function to several different identifiers from among the set of all the possible identifiers.

The invention moreover proposes a verifier device arranged in order to exchange items of information with a set of entities via at least one communication channel, each entity from said set of entities having a first respective identifier, from which a plurality of representatives can be obtained. This verifier device comprises:

a unit for obtaining a first identification word, related to an entity for which a search is carried out, the first identification word being formed by applying a first encoding function to the first identifier of the entity for which the search is being carried out, so as to depend on a sub-portion of the plurality of representatives that can be obtained from said first identifier, said sub-portion being determined by at least one variable parameter; and a unit for transmitting, over the communication channel, the first identification word obtained by said obtaining unit.

The invention also proposes an entity belonging to a set of entities able to exchange items of information with a verifier device via at least one communication channel and each having a first respective identifier, from which a plurality of representatives can be obtained. Said entity comprises:

a unit for receiving an identification word corresponding to a first identification word transmitted over the communication channel by the verifier device, the first identification word being formed by applying a first encoding function to the first identifier of the entity for which the search is being carried out, so as to depend on a sub-portion of the plurality of representatives that can be obtained from said first identifier, said sub-portion being determined by at least one variable parameter; and a unit for applying a first identification function associated with the first encoding function to the received identification word and to the first identifier of said entity and to an item of information known by said entity from among the first identifier of said entity and at least one representative from the plurality of representatives that can be obtained from said first identifier, so as to verify whether said entity corresponds to the entity being searched for.

The invention also proposes a system for searching for an entity belonging to a set of entities using a verifier device, the system comprising means suitable for carrying out the method mentioned above.

BRIEF DESCRIPTION OF THE DRAWINGS

Other features and advantages of the present invention will become apparent from the following description of non-limitative embodiment examples, with reference to the attached drawings, in which.

DETAILED DESCRIPTION OF THE DRAWINGS

Figure 1:
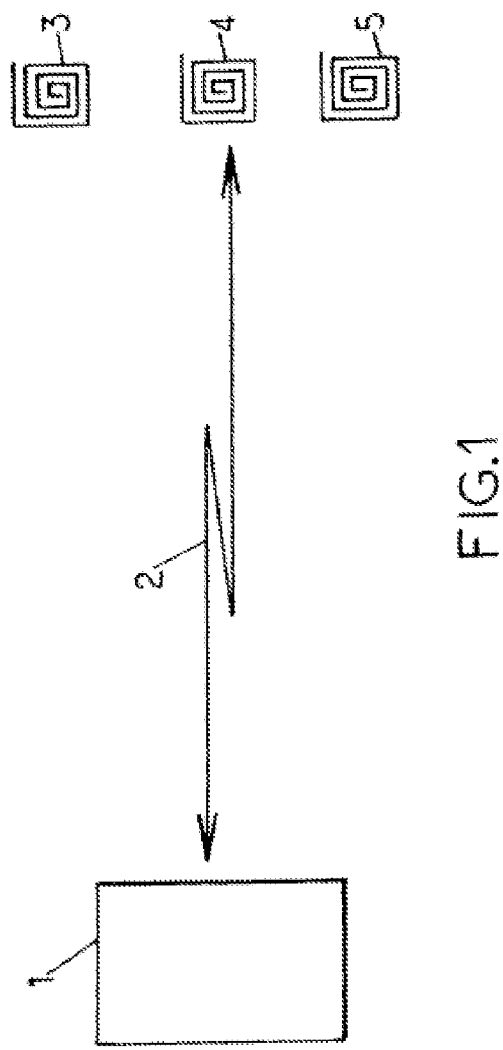
FIG. 1 is an architecture diagram for an example of a system capable of carrying out the invention.

FIG. 1 shows a verifier device 1 and a set of entities arranged so as to exchange items of information via a communication channel 2. The entities 3-5 shown can constitute, just in themselves, the set of the existing entities. Alternatively, they can correspond only to the entities capable of communicating via the communication channel at a given time. Other entities can then optionally be added to them or replace them at other observation times.

As indicated in the introduction, each entity 3-5 can consist of any hardware and/or software element, optionally associated with a device, a system or an individual. In the example of FIG. 1, the entities 3-5 have been represented as being wireless identification tags, such as RFID (Radio Frequency IDentification) labels. Alternatively, they could be access badges, chip cards, mobile phones, computers connected to a network, or other. The entities 3-5 moreover need not all be of the same nature. By way of illustration, they could relate to a mobile phone in the first case, an RFID label associated with an article in the second case, and a computer in the third case.

The verifier device 1 can also take various forms depending on the type of entities for which it is intended to search, as also pointed out in the introduction. It can for example be a wireless identification reader, such as an RFID reader as illustrated in FIG. 1, a sensor, a server, or other.

The communication channel 2, for its part, is suitable for exchanging items of information between the verifier device 1 and the entities 3-5. According to the requirements, it can be wired or wireless. In the example of FIG. 1, the communication channel 2 is a radio channel, since the verifier device 1 is an RFID reader and all or some of the entities 3-5 are RFID labels. When entities of different nature have to be able to communicate with the verifier device, several communication channels can be used. For example, a wired communication channel and a wireless communication channel can be used with wired entities and wireless entities respectively.

Moreover, the communication channel 2 can be simple, i.e. it provides a direct communication between the verifier device 1 and the entities 3-5, for example via a given radio frequency. Alternatively, this communication channel 2 can be more elaborate. It can for example consist of a set of communications resources from a communications network, such as a computer network, a telecommunications network, or other.

According to the invention, an entity belonging to the set of entities mentioned above, for example the entity 4, is searched for using the verifier device 1. In other words, knowledge is sought, using the verifier device 1, as to whether the entity 4 is listening on the communication channel 2. If the communication channel 2 is a channel with a short range, this amounts to finding out if the entity 4 is close to the verifier device 1.

It will be understood that the nature of the verifier device 1, of the entities 3-5 and of the communication channel 2 will be suitable for the intended use. Thus, if it is desired to be able to check for the presence of individuals inside sensitive sites or the access of a small number of individuals to sensitive sites, it is possible for example to use access badges equipped with RFID chips associated with individuals as entities, an RFID reader as verifier device, and a radio channel using frequencies suitable for RFID technology as communication channel. Alternatively, if it is desired to make the implementation of an online computer application conditional on an identity check, the communication channel can then consist of communication resources in a computer network, the entities used can comprise computers connected to this network, and the verifier device is for example a server connected to this network.

Of course, other examples of use can be envisaged according to the principles of the invention, as will be apparent to a person skilled in the art.

Each of the entities 3-5 has a respective identifier, in the sense that there is an association between this entity and the respective identifier. A plurality of representatives can be obtained from such an identifier. For example, an identifier m relating to an entity can be directly constituted by a plurality of representatives $m_k$, with k ranging from 1 to an integer n, i.e. $m=(m_1, m_2, \ldots, m_n)$. In this case, each representative $m_k$ can be obtained from the identifier m by a simple selection within m. More generally, the plurality of representatives $m_k$ can be obtained from the corresponding identifier m using one or more generation functions $f_k$ provided for this purpose. This can be expressed for example as follows: $m_k=f_k(m)$. It can also be provided that a single generation function f makes it possible to deduce all the representatives $m_k$ from the identifier m, for example by an iterative process, by successively obtaining the different representatives from one or more already-obtained representatives.

An identifier is for example a chain of values, for example binary characters, bytes or other. In the case where $m=(m_1, m_2, \ldots, m_n)$, each representative $m_k$ can for example constitute one or more successive values of m. Of course, other designs are possible, as will be apparent to a person skilled in the art.

Each identifier is preferably unique, in order to avoid ambiguity between the thus-identified entities. On the other hand, some identifiers can optionally have common representatives.

The identifiers can be formed according to a given model. By way of example, the identifiers can be formed as chains of n binary characters, which makes it possible to have $2^n$ identifiers in total. It is thus possible to obtain a number of possible identifiers that is greater than the number of entities actually involved.

Each of the entities 3-5 is capable of knowing its identifier, or the plurality of representatives that can be obtained from its identifier. This knowledge can originate from the fact that the identifier and/or the corresponding representatives are stored in a memory of the entity concerned. Alternatively, it can be acquired by consulting an external memory, by receiving these items of information from an external memory, or other.

The verifier device 1, for its part, is capable of knowing the identifier and/or the plurality of representatives that can be obtained from the identifier of each of the entities from the set of entities. Again, this knowledge can originate from a storage in a memory of the verifier device 1, from a consultation of an external memory, from a receipt of these items of information from an external memory, or other.

Advantageously, the ability to obtain the plurality of representatives that can be obtained from an identifier is only given to the entity having this identifier and to the verifier device. This can be carried out in several ways.

For example, the identifier in question can be stored in protected memories which can be accessed only by the entity having this identifier on the one hand and by the verifier device on the other hand. The identifier is never transmitted over the communication channel. As the identifier of said entity is not known to third parties, the latter are unable to obtain its representatives.

Alternatively or as an addition, the representatives of the identifier in question can be stored in protected memories which can be accessed only by the entity having this identifier on the one hand and by the verifier device on the other hand. They are not all transmitted simultaneously over the communication channel. Third parties therefore cannot know the representatives related to said entity.

It can also be provided that the identifier in question is an item of public data, but that the generation function making it possible to obtain the corresponding representatives is secret. In this way, a third party having the identifier is prevented from being able to deduce from it the corresponding representatives.

Searching for an entity according to the invention uses the concept of an identification code. An example of this identification code concept is described in particular in the article by Rudolf Ahlswede and Gunter Dueck entitled "Identification via Channels", IEEE transactions in information theory, Vol. 35, No. 1, published in January 1989 (the disclosure of which is hereby incorporated by reference).

Generally, a word c of such an identification code, hereafter called an identification word, is calculated by applying an encoding function to an identifier m, from which a plurality of representatives $m_k$, with k ranging from 1 to an integer n, can be obtained. The encoding function fc is chosen in order that the identification word obtained depends on a sub-portion of the plurality of representatives $m_k$. In other words, the identification word can depend on one or more representatives $m_k$ of m, but not on all the representatives $m_1, m_2, \ldots, m_n$. The sub-portion of the plurality of representatives $m_k$ on which the identification word depends is determined by at least one variable parameter.

An identification function fi is associated with the encoding function fc used to calculate the identification word c from the identifier m.

The properties of the identification code are for example such that:

if y1 is a word obtained by applying the encoding function fc to the identifier m, the application of the identification function fi to y1 and to m or at least some of its representatives wrongly concludes that there is no correspondence with a probability less than $\lambda 1$; and if y2 is a word obtained by applying the encoding function fc to the identifier m', different from m, the application of the identification function fi to y2 and to m or at least some of its representatives wrongly concludes that there is a correspondence with a probability less than $\lambda 2$.

The smaller $\lambda 1$ and $\lambda 2$ are, the more reliable the identification code.

Advantageously, the encoding function fc used within the framework of the present invention can moreover be arranged in order that a single identification word may be the result of applying this encoding function fc to several different identifiers from among the set of all the possible identifiers. By way of non-limitative example, if the identifiers each consist of a series of representatives, some representatives capable of being common between at least two different identifiers, an encoding function fc consisting of selecting a representative of given rank from a series of representatives, can sometimes return the same value when applied to two different identifiers.

A specific and useful example of an identification code that can be used within the framework of the present invention is that described in the article by Pierre Moulin and Ralf Koetter entitled "A framework for the Design of Good Watermark Identification Codes", Security, Steganography, and Watermarking of Multimedia Contents VIII, San Jose, Calif.; pp. 565-574; ISBN/ISSN: 0-8194-6112-1, published in January 2006 (the disclosure of which is hereby incorporated by reference). Any other identification code can of course be used instead of or in addition to this.

Searching for an entity according to the invention is carried out by obtaining, in an obtaining unit of the verifier device 1, an identification word c related to the entity being searched for. This obtaining can be carried out by a calculation according to the principles disclosed above, carried out in the verifier device, in a different device transmitting the identification word calculated in the verifier device, or in a shared manner between these two devices. Alternatively, this obtaining can be carried out by finding the identification word c related to the entity being searched for, for example in a memory of the verifier device 1.

Once the identification word c has been obtained in the verifier device 1, a transmission unit of the latter transmits it over the communication channel 2. As the communication channel 2 is common to all the entities, the transmitted identification word can be received by any entity 3-5 listening on this channel.

Each entity 3-5 having received, using an appropriate receiving unit, an identification word corresponding to the transmitted identification word (with the possible exception of transmission errors, when the communication channel 2 introduces errors, for example because it is noisy) can then advantageously apply, using an appropriate application unit, the identification function fi associated with the encoding function fc to the received identification word and to an item of information that it knows from among its identifier and at least one representative from the plurality of representatives that can be obtained from its identifier, so as to verify whether said entity corresponds to the entity being searched for.

In order to enhance the reliability of the verification carried out by each entity 3-5, the identification word obtained by the verifier device 1 is advantageously transmitted with a transmission code, which is an error-correcting code. Any known error-correcting code can be used for this purpose. Each entity 3-5 then advantageously has the associated decoding function that allows it to find the identification word transmitted by the verifier device 1, error-free or at least with a limited amount of errors.

Priority will be given to an error-correcting code suitable for the nature of the entities 3-5, of the verifier device 1 and of the communication channel 2. By way of example, if the exchanges of items of information take place over a very noisy wireless communication channel 2, a robust error-correcting code, with for example a high redundancy will be favored.

The method of constructing the identifiers and their representatives can also be taken into account in choosing the error-correcting code used. For example, if at least one of the probabilities $\lambda 1$ and $\lambda 2$ mentioned above is higher, it may be desirable to give priority to an error-correcting code capable of correcting a large amount of errors in order not to worsen the poor performance of the identification.

Non-limitative embodiment examples will now be described in order to illustrate the type of verification possible according to the invention. In all these examples, the architecture of FIG. 1 is adopted, and it is assumed that the entity 4 is being searched for using the verifier device 1.

Figure 2:
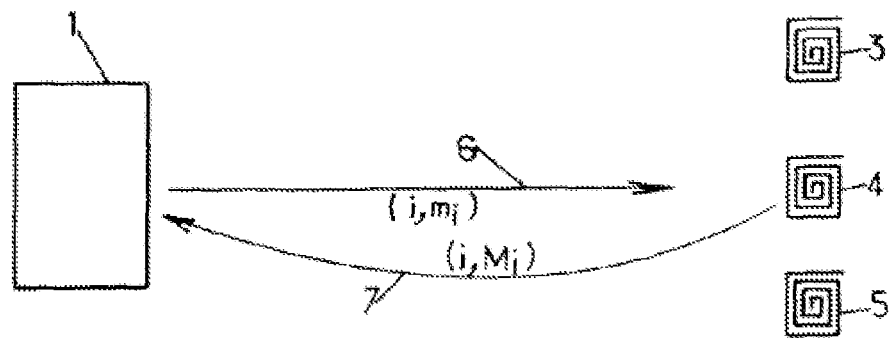
FIGS. 2 to 4 are diagrams showing non-limitative embodiment examples of the invention.

In the example shown in FIG. 2, the identifiers of the entities are chains of values consisting of series of representatives. In particular, the entity 4 has, as identifier, $m=(m_1, m_2, \ldots, m_n)$, of which $m_1, m_2, \ldots, m_n$ are the representatives.

Initially, the verifier device 1 chooses a number i between 1 and n. The choice of i can be carried out randomly or almost randomly. Then, the verifier device 1 selects the representative $m_i$ of m from rank i in the chain $m=(m_1, m_2, \ldots, m_n)$. It is this representative $m_i$ that then constitutes the identification word c in this case.

In this example, the choice of the representative by its rank in the identifier m is a variable parameter which determines the sub-portion of the plurality of representatives that can be obtained from the identifier m, in this instance only one of the n representatives.

Alternatively, several indices could be chosen instead of the single index i in order to select more than one representative. For example, the optionally random drawing of the numbers (i,j) between 1 and n could make it possible to obtain an identification word c of the type $(m_i, m_j)$ or also any combination between $m_i$ and $m_j$, such as for example $m_i+m_j$.

In step 6 of FIG. 2, the verifier device 1 transmits the identification word $m_i$ obtained over the communication channel 2. Advantageously, the verifier device 1 also transmits, over the communication channel 2, the number i that was used to select the representative $m_i$, or any other indication of the value of i. These two items of information can be transmitted in a single message or in two different messages.

Afterwards, each of the entities 3-5 listening on the communication channel 2 having received an identification word corresponding to the identification word $m_i$ transmitted by the verifier device 1 can verify whether it is the entity being searched for.

In particular, the entity 4 receives an identification word $\tilde{m}_i$ which corresponds to $m_i$, with the possible exception of a few transmission errors. It also advantageously receives the number $\tilde{\imath}$ which corresponds to i, with the possible exception of a few transmission errors.

The encoding function fc used by the verifier device 1 consisted of selecting a representative from the plurality of representatives $m_1, m_2, \ldots, m_n$ of the entity 4. The identification function fi associated with this encoding function and used by the entity 4 (as well as by each of the other entities listening on the communication channel 2) consists, for its part, in finding the representative of rank $\tilde{\imath}$ within the identifier m of the entity 4, then comparing it with the received identification word $\tilde{m}_i$.

In the case of concordance, the entity 4 considers that it is indeed the entity being searched for and advantageously sends a response 7 via the communication channel 2 to the verifier device 1 in order to inform it of this.

It will be noted that, if the number i is not transmitted by the verifier device 1, the verification is still possible in the entity 4, but by comparing the identification word $\tilde{m}_i$ with all or some of the representatives $m_1, m_2, \ldots, m_n$, rather than with the single representative of rank $\tilde{\imath}$.

In the above example, it was considered that the entity 4 could know its identifier m, for example because it was stored in its memory. If only the representatives $m_1, m_2, \ldots, m_n$ of m are known by the entity, but not their order within m, it is also possible to carry out a comparison of the received identification word $\tilde{m}_i$ with all or some of the known representatives of the entity 4.

In these last two cases, concordance between the received identification word $\tilde{m}_i$ and any one of the representatives known or obtained from m by the entity 4 can suffice to conclude that the entity 4 is indeed the entity being searched for.

In the case where the entity 4 sends a response 7 to the verifier device 1 via the communication channel 2, this response can simply mean that the entity 4 considers itself to be corresponding to the entity being searched for. Conversely, if the entities 3 and 5 do not consider themselves to be corresponding to the entity being searched for, they do not send a response to the verifier device 1. The latter is then capable of concluding that the entity 4 is indeed the one that it is searching for.

As the encoding function is probabilistic and not deterministic, it is possible that several entities consider themselves to be the entity being searched for. In this case, the verifier device 1 can receive several responses 7 to its request 6 from several entities via the communication channel 2. It will then advantageously be able to refine its search in order to identify the entity being searched for. By way of example, it will be able to requery the entities 3-5 by choosing and transmitting a pair $(j,m_j)$ different from $(i,m_i)$. Advantageously, the transmitted pair $(j,m_j)$ will be chosen in order to avoid a new ambiguity between the entities which sent responses 7, i.e. so that only one of these entities considers itself to be corresponding to the entity being searched for.

In the example shown in FIG. 2, the response 7 sent by the entity 4 via the communication channel 2 contains information based on the same principle as the request 6.

For this purpose, in addition to m, the entity 4 knows, by storage in its memory for example, a second identifier $M=(M_1, M_2, \ldots, M_n)$ or all or some of its representatives $M_1, M_2, \ldots, M_n$ without considering the order. It also has a second encoding function Fc which may be different or identical to fc. The entity 4 is then capable of obtaining a second identification word by applying the second encoding function Fc to the item of information that it knows from among M and at least one of the representatives $M_1, M_2, \ldots, M_n$.

In the example of FIG. 2, the second encoding function Fc is the same as fc and its variable parameter is fixed at the same value as that chosen by the verifier device 1, i.e. i. Thus, the response 7 sent by the entity 4 includes the second identification word $M_i$. The number i can optionally be transmitted in addition to $M_i$ if the verifier device 1 is not aware that the second encoding function Fc uses the same value of variable parameter as fc.

It is possible that the second identifier M is in fact the same as the first identifier m. In this case, the response 7 will preferably include a pair $(j,m_j)$ different from $(i,m_i)$.

The fact of thus including additional information in the response 7 can make it possible for the verifier device 1 to carry out an additional verification of identity. It will be noted that this operating mode is not limited to the type of identifier described with reference to FIG. 2, but could apply whatever the identifier format used.

In order to carry out such an additional verification of identity, the verifier device 1 advantageously has a second identification function Fi associated with the second encoding function Fc. As was described in relation to the entity 4, the verifier device 1 applies the second identification function Fi to the identification word $\tilde{M}_i$ received in the verifier device 1 and to an item of information known by the verifier device 1 from among the identifier M of the entity 4 and at least one of its representatives $M_1, M_2, \ldots, M_n$.

This additional verification makes it possible to confirm or, on the contrary, deny that the entity 4 is the entity being searched for. This option is useful because it limits the identification errors likely to occur in the probabilistic model of the invention.

In comparison with the methods of the prior art mentioned in the introduction, the example that has just been described makes it possible to understand that the invention can authorize a search for an entity that improves the protection of its identity.

An attacker listening on the communication channel 2 and a priori having no knowledge of the identifiers of the entities and of their representatives will in general not be able to find the identifier m of the entity 4 from the transmitted representatives $m_i$ and $M_i$.

The task of the attacker listening on the communication channel 2 is made particularly difficult, because the encoding carried out is probabilistic and not deterministic, as it depends on at least one variable parameter. As a result, different identification words can make it possible to identify a single entity.

Moreover, the total number of possible identification words is much higher than the total number of identifiers. It is therefore almost impossible for an attacker to discover all the identification words relating to a given entity by listening on the communication channel 2 for a limited time.

And even if the attacker was capable of knowing the identifiers of some entities and/or their representatives, he would not necessarily be able to conclude, with certainty, as to the identity of the entity that sent a response, in particular in the case where the encoding function is likely to result in a single identification word when it is applied to several different identifiers.

Thus, the invention can in particular make it possible to improve the respect for the private life of individuals and to make tracing a device more difficult.

Another advantage of the invention resides in its efficiency. In the example described with reference to FIG. 2, if it is supposed that each representative $m_1, m_2, \ldots, m_n$ constituting the identifier m consists of one byte, i.e. eight bits, the search can approximately require only the transmission of one byte (transmission of $m_1$ in step 6). In comparison, the transmission of all of the identifier $m=(m_1, m_2, \ldots, m_n)$ by the verifier device, as in the prior art, for its part requires n bytes.

The above advantages are not limited to the example described with reference to FIG. 2, as will be apparent to a person skilled in the art.

Figure 3:
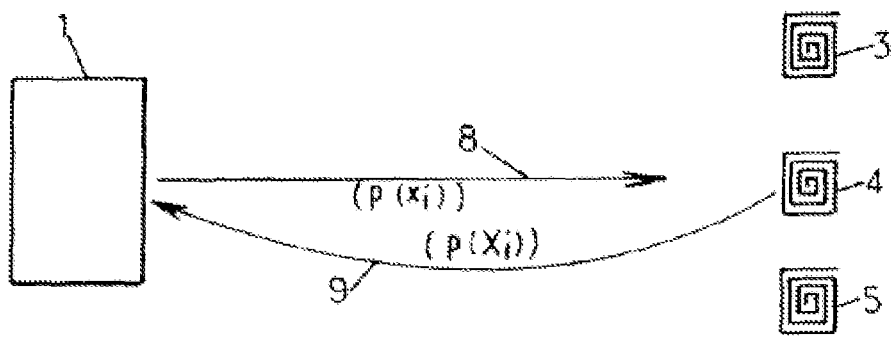

FIG. 3 shows another embodiment example of the invention. In this example, each of the entities 3-5 has an identifier in the form of a respective polynomial. The representatives that are able to be obtained from such an identifier are for example evaluations of this polynomial at different points, or coefficients of this polynomial.

For example, the identifier related to the entity 4 can be the polynomial p(x) and the corresponding representatives can be the evaluations of this polynomial in a set of determined points $x_1, x_2, \ldots, x_n$ with n integer, i.e. $p(x_1), p(x_2), \ldots, p(x_n)$.

The encoding function fc used by the verifier device 1 in this case can for example consist of selecting one of these evaluations at random, for example $p(x_i)$. This identification word $p(x_i)$ is transmitted from the verifier device 1 over the communication channel 2 in step 8.

On receipt of a corresponding identification word, each of the entities 3-5 listening on the communication channel 2 compares it to all or some of the evaluations that it has for example in its memory, in order to determine a possible similarity.

In the case of concordance for example for the entity 4, the latter sends a response 9 to the verifier device 1 via the communication channel 2. This response can for example include an evaluation $p(X_i)$ obtained by applying the polynomial p to a point $X_i$ different from $x_1, x_2, \ldots, x_n$. Alternatively, the response 9 could include an evaluation $P(x_i)$, where P is a polynomial different from p. As another alternative, the response 9 could include an evaluation $p(x_j)$ with j being different from i.

Figure 4:
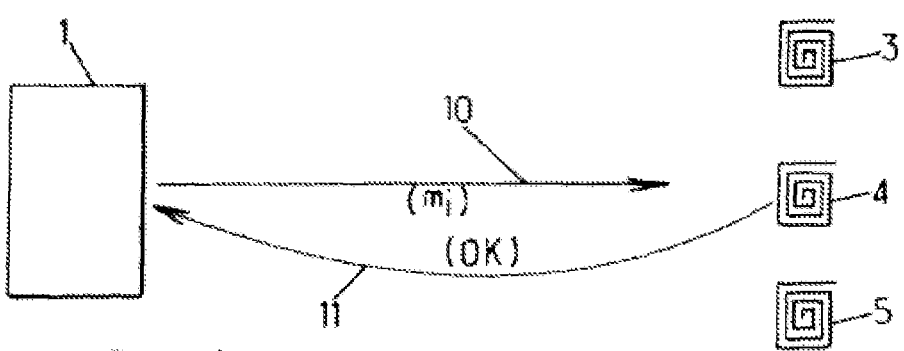

FIG. 4 shows another embodiment example, in which each entity has, as identifier, a number, for example comprised between 1000 and 10,000, and in which the representatives that can be obtained from this identifier are binary vectors of fixed length, for example 20,000, and with a weighting equal to the corresponding identifier. Thus, all the representatives $m_1, m_2, \ldots, m_n$ that can be obtained from the identifier N, with N comprised between 1000 and 10,000, have for example a number of 1 equal to N and a number of 0 equal to 20000-N, these representatives differing from each other by the position of the 0s and of the 1s. It will be understood that these numerical values are given by way of illustration only and they are not to limit the generality of the topic.

The verifier device 1 which is searching for the entity 4 of identifier N for example chooses at random a representative $m_i$ of the identifier N, i.e. a binary vector having N bits at 1 and 20000-N bits at 0. Then it transmits the representative $m_i$ as an identification word over the communication channel 2 in step 10.

The entity 4 knows its identifier N, for example because it stores it in its memory. On receipt of an identification word of length 20,000 corresponding to the transmitted representative $m_i$, the entity 4 calculates its weighting, i.e. its number of 1 and compares it with N. This involves an identification function applied to the received identification word and to the identifier N of the entity 4.

If equal, the entity 4 considers that it is the entity that is being searched for and sends a response 11 to the verifier device 1 via the communication channel 2. This response can be interpreted as such by the verifier device 1. In this example, the response 11 does not contain other useful information.

A person skilled in the art will understand that the examples described with reference to FIGS. 2 to 4 are not limitative. Many other possibilities can be envisaged according to the general principles of the invention described above. In particular, encoding and/or identification functions different from those described can be used.

It will be noted that all or some of the operations described with reference to the different figures can be carried out completely or partially using software, i.e. using a computer program product comprising code instructions suitable for this purpose. As an alternative or in addition, at least some of these steps can be carried out using an electronic circuit.

The invention claimed is:

1. Method for searching for an entity, comprising:
    searching for an entity belonging to a set of entities using a verifier device, the verifier device and the entities of said set of entities being arranged so as to exchange items of information via at least one communication channel, each entity of said set of entities having a first respective identifier, from which a plurality of representatives can be obtained, wherein searching comprises:
    obtaining, in the verifier device, a first identification word, related to an entity for which a search is carried out, the first identification word being formed by applying a first encoding function to the first identifier of the entity for which the search is being carried out, so as to depend on a sub-portion of the plurality of representatives that can be obtained from said first identifier, said sub-portion being determined by at least one variable parameter, said value of the variable parameter determining the sub-portion of the plurality of representatives that can be obtained from said first identifier being chosen, by the verifier device, at random or almost at random; and
    transmitting, from the verifier device, the first identification word, obtained over the communication channel.

2. Method according to claim 1, also comprising the following, implemented by each entity of said set of entities listening on the communication channel:
    receiving an identification word corresponding to the first identification word transmitted over the communication channel; and
    applying a first identification function associated with the first encoding function to the received identification word and to an item of information known by said entity from among the first identifier of said entity and at least one representative of the plurality of representatives that can be obtained from said first identifier, so as to verify whether said entity corresponds to the entity being searched for.

3. Method according to claim 2, wherein an indication of the value of the variable parameter used to form the first identification word obtained is transmitted from the verifier device over the communication channel, and wherein, for each entity of said set of entities listening on the communication channel, said application of the first identification function takes into account the indication of the value of the received variable parameter.

4. Method according to claim 2, wherein, when the result of said application of the first identification function reveals that said entity corresponds to the entity being searched for, said entity sends a response to the verifier device via the communication channel.

5. Method according to claim 4, wherein said entity has a second identifier, from which a plurality of representatives can be obtained, in a second identification word is obtained which in said entity by applying a second encoding function to an item of information known by said entity from among the second identifier of said entity and at least one representative of the plurality of representatives that can be obtained from said second identifier so as to depend on a sub-portion of the plurality of representatives that can be obtained from said second identifier, said sub-portion being determined by at least one variable parameter, and wherein the response sent by said entity to the verifier device via the communication channel includes the second identification word.

6. Method according to claim 5, wherein an identification word corresponding to the second identification word included in said response is received in the verifier device, and wherein the verifier device applies a second identification function associated with the second encoding function to the identification word received in the verifier device and to an item of information known by the verifier device from among the second identifier of said entity and at least one representative from the plurality of representatives that can be obtained from said second identifier, so as to bring about a further verification of a correspondence between said entity and the entity being searched for.

7. Method according to claim 2, wherein the first encoding function is arranged such that, when it is applied to the first identifier of the entity being searched for, said variable parameter selects at least one representative from the plurality of representatives that can be obtained from said first identifier, and wherein said application of the first identification function comprises a comparison between said representative selected by said variable parameter and at least one representative from the plurality of representatives that can be obtained from the first identifier of said entity.

8. Method according to claim 2, wherein the first identification word obtained is transmitted over the communication channel from the verifier device in an encoded way using an error-correcting code.

9. Method according to claim 2, wherein the communication channel is a wireless channel, and wherein the verifier device comprises a wireless identification reader and at least some of the entities from the set of entities comprise wireless identification tags.

10. Method according to claim 2, wherein the ability to obtain the plurality of representatives that can be obtained from an identifier is only given to the entity from said set of entities having said identifier and to the verifier device.

11. Method according to claim 2, wherein the first encoding function is arranged such that a single first identification word may be the result of the application of the first encoding function to several different identifiers from among the set of all the possible identifiers.

12. Verifier device arranged so as to exchange items of information with a set of entities via at least one communication channel, each entity from said set of entities having a first respective identifier, from which a plurality of representatives can be obtained, the verifier device comprising:
  a unit for obtaining a first identification word, related to an entity for which a search is carried out, the first identification word being formed by applying a first encoding function to the first identifier of the entity for which the search is being carried out, so as to depend on a sub-portion of the plurality of representatives that can be obtained from said first identifier, said sub-portion being determined by at least one variable parameter, said value of the variable parameter determining the sub-portion of the plurality of representatives that can be obtained from said first identifier being chosen, by the verifier device, at random or almost at random; and
  a unit for transmitting, over the communication channel, the first identification word obtained by said obtaining unit.

13. An apparatus, comprising:
  a receiver coupled to a verifier device over a communication channel and configured to receive an identification word corresponding to a first identification word transmitted over the communication channel by the verifier device, the first identification word being formed by applying a first encoding function to a first identifier of the entity for which the search is being carried out, so as to depend on a sub-portion of the plurality of representatives that can be obtained from said first identifier, said sub-portion being determined by at least one variable parameter, said value of the variable parameter determining the sub-portion of the plurality of representatives that can be obtained from said first identifier being chosen, by the verifier device, at random or almost at random; and
  a data processing unit configured to apply a first identification function associated with the first encoding function to the received identification word and to the first identifier of said entity and to an item of information known by said entity from among the first identifier of said entity and at least one representative from the plurality of representatives that can be obtained from said first identifier, so as to verify whether said entity corresponds to the entity being searched for.

14. Apparatus according to claim 13, wherein the first identification word obtained is transmitted over the communication channel from the verifier device in an encoded way using an error-correcting code.

15. Apparatus according to claim 13, wherein the communication channel is a wireless channel, and wherein the verifier device comprises a wireless identification reader and at least some of the entities from the set of entities comprise wireless identification tags.

16. Apparatus according to claim 13, wherein the ability to obtain the plurality of representatives that can be obtained from an identifier is only given to the entity from said set of entities having said identifier and to the verifier device.

17. Apparatus according to claim 13, wherein the first encoding function is arranged such that a single first identification word may be the result of the application of the first encoding function to several different identifiers from among the set of all the possible identifiers.

18. System of searching for an entity belonging to a set of entities using a verifier device, the verifier device and the entities of said set of entities being arranged so as to exchange items of information via at least one communication channel, each entity of said set of entities having a first respective identifier, from which a plurality of representatives can be obtained, the system comprising:
  means for obtaining, in the verifier device, a first identification word, related to an entity for which a search is carried out, the first identification word being formed by applying a first encoding function to the first identifier of the entity for which the search is being carried out, so as to depend on a sub-portion of the plurality of representatives that can be obtained from said first identifier, said sub-portion being determined by at least one variable parameter, said value of the variable parameter determining the sub-portion of the plurality of representatives that can be obtained from said first identifier being chosen, by the verifier device, at random or almost at random; and
  means for transmitting, from the verifier device, the first identification word, obtained over the communication channel.

19. System according to claim 18, further comprising, at each entity of said set of entities listening on the communication channel:
  means for receiving an identification word corresponding to the first identification word transmitted over the communication channel; and
  means for applying a first identification function associated with the first encoding function to the received identification word and to an item of information known by said entity from among the first identifier of said entity and at least one representative of the plurality of representatives that can be obtained from said first identifier, so as to verify whether said entity corresponds to the entity being searched for.

* * * * *